Feb. 6, 1962  G. DOMMANN  3,019,813
CONDUIT PROVIDED WITH MOVABLE FITTING
Filed Sept. 18, 1958
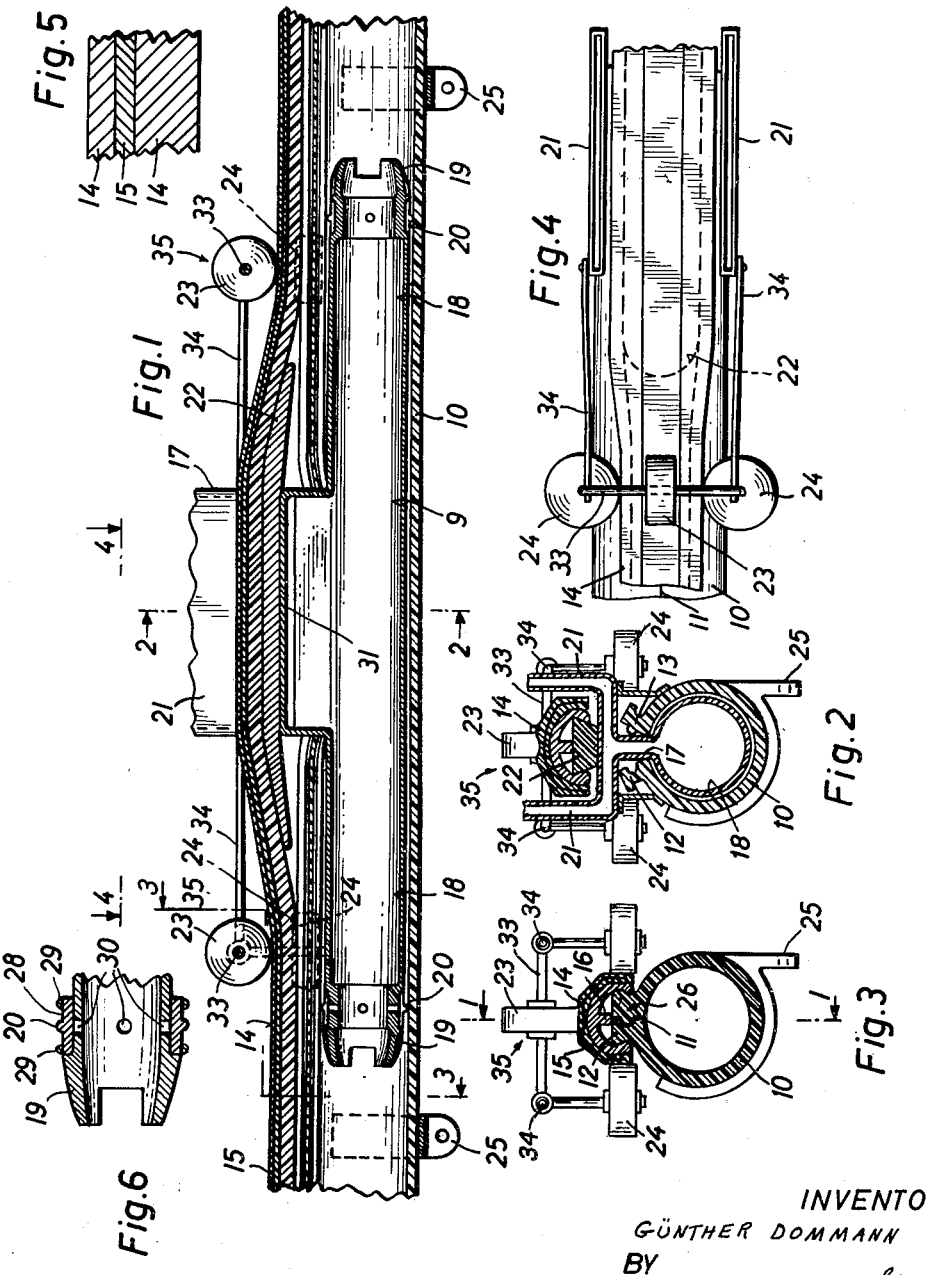
INVENTOR
GÜNTHER DOMMANN
BY
Burgess, Dinklage + Sprung
ATTORNEYS : 3,019,813
CONDUIT PROVIDED WITH MOVABLE FITTING
Günther Dommann, Wethmar, near Lunen, Westphalia, Germany, assignor to Gewerkschaft Eisenhutte Westfalia, Wethmar, near Lunen, Westphalia, Germany, a corporation of Germany
Filed Sept. 18, 1958, Ser. No. 761,791
Claims priority, application Germany Sept. 26, 1957
5 Claims. (Cl. 137—580)

The invention relates to a conduit provided with a movable fitting. More particularly, the invention relates to a conduit provided with a fitting which may be moved axially to the extent desired along the length of the conduit.

In many industrial operations, it is necessary to connect portable equipment to a conduit. Heretofore, such connection has been made by installing a flexible line between the operating unit and conduit, the line being of sufficient length so that the extent of movement desired is obtainable without altering the connection to the conduit. Such equipment has also been connected to a conduit by using a connecting line of limited length and providing the conduit with a series of fittings, so that the desired movement can be obtained by periodically changing the point at which the connecting line is connected to the conduit. The use of a long connecting line has the disadvantage that the line is cumbersome to handle, and the use of a short line together with a multitude of fittings in the conduit has the disadvantage that it is necessary to interrupt operation in order to change the position of connection.

The primary object of the present invention is to provide a conduit with a fitting which is movable axially of the conduit to the extent desired.

The manner in which this and other objects are attained, according to the invention, will be apparent from the following description of the invention taken together with the accompanying drawing. In the drawing:

FIG. 1 is an axially cross-sectional view of a conduit provided with a fitting according to the invention, the section being taken along line 1—1 in FIG. 3;

FIG. 2 is a cross-sectional view, taken along line 2—2 in FIG. 1;

FIG. 3 is a cross-sectional view taken along line 3—3 in FIG. 1;

FIG. 4 is a view taken along line 4—4 in FIG. 1;

FIG. 5 is an enlarged view of a portion of the conduit fitting combination shown in FIG. 1 and showing some details of the construction of the fastener of the conduit-fitting combination shown in FIG. 1; and FIG. 6 is a cross-sectional view of a portion of the fitting shown in FIG. 1, more particularly showing in detail the construction of the end portion of the T head of the fitting shown in FIG. 1.

According to the invention, the fitting-conduit combination comprises a T fitting and a conduit which comprises a flexible material which defines a longitudinally extending slit through the conduit wall. The flexible material can be, for example, rubber or plastic or reinforced rubber or plastic. The T fitting is characterized in that the T head thereof is formed as an open ended conduit and the T stem is also formed as an open ended conduit and communicates with the T head. The T head and stem can be disposed normal to each other or at and angle other than 90°. The fitting is positioned with the T head disposed lengthwise within the conduit and the T stem projecting to the outside of the conduit through the longitudinally extending slit in the conduit which extends the length thereof. Thus, the fitting is movable relative to the conduit.

Suitable means are provided for sealing the fitting in the conduit. Thus, there are provided slit sealing means which seal the slit in the conduit on each side of the T stem up to a position on each side of the T stem, adjacent the T stem, and hermetic sealing means are provided for hermetically sealing conduit pressure from the slit between the referred to positions. The T fitting, slit sealing means, and hermetic sealing means are arranged so that they are slidable axially of the conduit. This construction makes it possible to obtain fluid-tight connections at different points along the conduit with the one conduit fitting.

Referring to the embodiment depicted in the drawing, the conduit-fitting combination includes a conduit 10 and a T fitting 9. The conduit is formed of rubber or other suitable flexible material and is secured in place by brackets 25. A slit 11 extends longitudinally along the conduit, and extends radially through the conduit wall. To provide for suitably sealing the slit 11 the wall portions 12 and 13 of the conduit wall which defining the slit, are provided with a tongue and groove joint 26, and a C shaped fastener 14 is provided which clamps the wall portions 12 and 13 together. The fastener 14 is formed of a flexible material such as, for example, rubber, and has imbedded therein, a resilient metal strip 15 (see FIG. 5) which serves to impart to the fastener good clamping action. Furthermore the fastener 14 is provided with an inwardly directed profile part or slot cover 16 which in addition rests resiliently and thus effects an additional seal against the outer edge of the slit 11.

The removal of the pressure medium from conduit 10 is effected through T stem 17, the transversely extending T head pieces 18 of which are disposed lengthwise within the conduit. The ends of these two T head pieces are tapered in ski like manner at each end portion 19. Furthermore, sealing beads 20 are provided which spring against the inner wall of the conduit 10 and are brought firmly into their sealing position under the action of the pressure medium flowing in the hose 10. The T stem 17 discharges, in the case of the embodiment shown in the drawing, in the two extension pieces 21, to which hoses or the like which are to be connected can be screwed.

The same T bears at the central portion of its length a wedge track 22 in the form of a slide which is arranged and tapered in such a manner toward its ends that it spreads the edges of the fastener 14 apart and at the same time raises them from the sealing edge of the conduit 10, as can be noted particularly clearly from FIGS. 1 and 2 of the drawing. The part of the withdrawal connection piece extending radially to the conduit 10 then leads between the two limiting edges of the slit 11 into the inside thereof so that the pressure medium flowing in the conduit can enter through the transversely extending pieces of T head 18 into the T stem 17 and flow off through the extensions 21.

The T stem 17, however, also bears in front of and behind the wedge-shaped track 22 work wheels 23 and 24, the former press the fastener 14 inwardly closing the slit while the latter press the opposite edges of the fastener away from each other so that the edges of the slit 11 are split apart.

In the case of the embodiment described, there is the possibility of moving the stem 17 back and forth in the longitudinal direction of the conduit 10 by means of the two extension pieces 21. Over a partial length of the T the slit 11 of the conduit then in each case opens, but the slit is in each case automatically opened and closed in front of and behind the T by the fastener in combination with the rollers 23 and 24. The T fitting 9 includes T head 18, and T stem 17. The T head is disposed lengthwise in the conduit 10, and the T stem projects from within the conduit through an opening made along the slit 11 and to without the conduit. To operate the fastener member 14 to seal the slit 11 adjacent the T stem 17 there are provided two wheel assemblies 35. The wheel assemblies are disposed at a spaced interval along the conduit with one on each side of the stem. Each wheel assembly includes a pair of opposed wheels 24 and a radially working wheel 23. The wheels of each assembly are joined together by a hoop axle 33 and each wheel assembly is connected to the fitting by an arm 34 which extends between the hoop axle and the extensions 21 of the T stem 17. Thus, as shown in the drawings the T stem 17 discharges into the extensions 21 to which hoses or the like which are to be connected can be attached. The opposed wheels 24 engage opposite sides of the fastener 14 and force the conduit wall portions 12 and 13 which define the slit 11, into tight engagement. The radially working wheel 23 presses the fastener 14 radially inwardly and forces the slot cover 16 which forms a part of the fastener arrangement 14 and which extends inwardly from the fastener 14, into tight engagement with the outer periphery of the slit 11.

Intermediate the wheel assemblies and the T stem, the slit 11 is open, and to hermetically seal the opening in the slit from pressure within the conduit, there are disposed at the outwardly positioned end portions of the T head 18, sealing beads 20. Thus, the arrangement shown in the drawing includes hermetic sealing means, including two circumferentially extending sealing beads 20 disposed at a spaced intreval along the conduit one on each side of the T stem, and these beads are positioned intermediate the T head and the conduit inside wall. As can be best seen in FIG. 6, each end portion 19 of the T head 18 is provided with a sleeve 28 which surrounds the T head adjacent the end thereof and has disposed circumferentially thereabout the sealing bead 20. The sleeve 28, is formed of an elastic material and is secured in place on the T head by bands 29. Vents 30 extend radially outward from within the T head to the resilient sleeve 28 and thus provide for applying to one side of the sleeves 28 the pressure existing within the conduit. This pressure is effective to press the beads 20 into tight engagement with the conduit inner wall so as to provide the desired hermetic seal. A feature of the conduit fitting combination is the relative positioning of the slit sealing means and the hermetic sealing means. As can be seen in FIG. 1 the beads 20 are disposed outwardly from T stem of the wheel assemblies. Due to this construction, the slit sealing means, in the form of the wheel assemblies and the hermetic sealing means disposed within the conduit, cooperate to provide the desired seal between the opening in the slit adjacent the T stem 17 and the pressure within the conduit.

A feature of the fitting-conduit combination of the invention is that the fitting can be moved along the conduit as desired while at all times maintaining the fluid connection between the conduit and a connecting line which is connected to the fitting (not shown). To provide for manipulating the fastener 14 during movement of the T fitting 9 there is provided a wedge track 22. The wedge track 22 rests on transverse conduit section 31 connecting extension pieces 21, which communicates with the T stem 17, and extends from the T stem 17 lengthwise of the conduit to adjacent the wheel assemblies 35. As the fitting is moved along the conduit and the leading wheel assembly moves over the fastener 14, the guide track disengages the fastener from the conduit wall, guides the fastener past the T stem, and then as the loosened fastener approaches the trailing wheel assembly, the wedge track 22 guides the fastener into position so that the radially working wheel of the trailing wheel assembly forces the fastener to engage the conduit wall so as to seal the slit 11.

The extensions 21 of the T stem 17 are provided so that connection to the fitting can be conveniently made. Thus, as can be seen from the drawings the T stem 17 discharges into the extensions 21 to which connections to air or other supply means can be made.

The conduit-fitting combination of the invention can advantageously be employed to supply air to moving equipment, such as a long face mining planer. In such service, the fitting of the invention can be continuously moved back and forth across the working face of a mine.

What is claimed is:

1. In combination a conduit and a fitting for making a fluid connection to the conduit, said conduit comprising a flexible material including means defining a longitudinally extending slit through the wall thereof, said fitting being essentially a T fitting having the T head formed as an open ended conduit and the T stem formed as an open ended conduit communicating with the T head, the fitting being positioned with the T head disposed lengthwise in the conduit, and the T stem extending through the slit in the conduit wall, slit sealing means sealing the slit in the conduit on each side of the T stem up to a position on each side of the T stem adjacent the T stem, and hermetic sealing means hermetically sealing conduit pressure from the slit between the referred to positions, said T fitting, slit sealing means and hermetic sealing means being slidable axially of the conduit, whereby pressure tight fluid connection can be made at different points along a length of the conduit.

2. The combination of claim 1, said slit sealing means comprising two wheel assemblies disposed at a spaced interval along the conduit one on each side of the stem, each wheel assembly being secured to the fitting and arranged to press wall portions forming said slit into fluid tight engagement, said hermetic sealing means comprising two circumferentially expanding sealing beads, disposed at a spaced interval along the conduit, one on each side of the T stem and intermediate the T head and the conduit inside wall, and secured to the T head, and pressing tightly against the inside of the conduit wall forming a hermetic seal, said beads being disposed outwardly from the T stem of the wheel assemblies.

3. The combination of claim 2, including means defining vents from the inside of the T head to the sealing beads, whereby fluid pressure can be communicated to said beads for pressing them into fluid tight relationship with the conduit inside wall.

4. The combination of claim 1, including a fastener for the longitudinal slit, said fastener being formed of a continuous length of flexible material and being disposed along said slit, said fitting, hermetic seal means, and slit sealing means being secured together for movement as a unit along the conduit, said fitting including wedge track means for manipulating the fastener as the fitting travels along the conduit, said manipulation involving disengaging the fastener as the fitting travels along the conduit, guiding the fastener past the T stem and engaging the fastener with the longitudinal slit after guiding it past the T stem.

5. The combination of claim 1, said slit sealing means comprising two wheel assemblies, disposed at a spaced interval along the conduit one on each side of the T stem, each wheel assembly being secured to the fitting and arranged to press wall portions forming said slit into fluid-tight engagement, said hermetic sealing means comprising two circumferentially expanding sealing beads disposed at a spaced interval along the conduit, one on each side of the T stem and intermediate the T head and the conduit inside wall and secured to the T head and pressing tightly against the inside of the conduit wall forming a hermetic seal, said beads being disposed outwardly from the T stem of the wheel assemblies, means defining vents from the inside of the T head to said sealing beads, whereby fluid pressure is communicated to said beads for presing them into fluid-tight relationship with the conduit inside wall, a fastener for the longitudinal slit, said fastener being formed of a continuous length of flexible material and being disposed along said slit, said fitting, hermetic seal means and slit sealing means being secured together for movement as a unit along the conduit, said fitting including wedge track means for manipulating the fastener as the fitting travels along the conduit, said manipulation involving disengaging the fastener as the fitting travels along the conduit, guiding the fastener past the T stem and engaging the fastener with the slit after guiding it past the T stem.

References Cited in the file of this patent

UNITED STATES PATENTS

| | | |
|---|---|---|
| 782,908 | James | Feb. 21, 1905 |
| 2,747,932 | Volk | May 29, 1956 |
| 2,798,506 | Baker et al. | July 9, 1957 |